United States Patent [19]

Guelpa

[11] 4,455,492

[45] Jun. 19, 1984

[54] POWER UNIT FOR MOTOR VEHICLE UTILIZING A THERMAL ENGINE DOWN TO THE LOWEST RUNNING SPEEDS

[76] Inventor: Jean Guelpa, 81 Ave. Corentin Cloarec, 92270 Bois-Colombes, France

[21] Appl. No.: 269,040

[22] PCT Filed: Sep. 16, 1980

[86] PCT No.: PCT/FR80/00137

§ 371 Date: May 14, 1981

§ 102(e) Date: May 14, 1981

[87] PCT Pub. No.: WO81/00833

PCT Pub. Date: Apr. 2, 1981

[30] Foreign Application Priority Data

Sep. 19, 1979 [FR] France ............................... 79 23343

[51] Int. Cl.³ ........................... B60L 11/14; H02J 7/14
[52] U.S. Cl. ..................................... 290/45; 290/4 C; 180/65.2; 318/139; 320/61
[58] Field of Search ........................... 290/4 C, 40, 45; 320/61, 62, 72; 322/4, 88; 318/139; 180/65 A

[56] References Cited

U.S. PATENT DOCUMENTS 3,842,287 10/1974 Nakamura ........................... 318/139
3,923,115 12/1975 Helling ................................. 290/45
4,021,677 5/1977 Rosen et al. .
4,165,795 8/1979 Lynch et al. ........................ 318/139
4,233,858 11/1980 Rowlett ............................... 290/45

FOREIGN PATENT DOCUMENTS 2805594 8/1979 Fed. Rep. of Germany .
2200800 4/1974 France .

Primary Examiner—G. Z. Rubinson
Assistant Examiner—Shelley Wade
Attorney, Agent, or Firm—Fleit, Jacobson, Cohn & Price

[57] ABSTRACT

Power unit for automobile vehicle utilizing an internal combustion engine down to the lowest rotation speeds.

Power unit for automobile vehicle comprising an internal combustion engine with its conventional inertia flywheel, a reversible electric machine, a storage battery, a speed variator coupling the electric machine to the internal combustion engine and an electric control circuit, the assembly being arranged to enable the internal combustion engine to operate at rotational speeds considerably lower than those normally afforded by its inertia flywheel by regularizing its output torque through instantaneous, alternately positive and negative exchanges of mechanical energy between the internal combustion engine and the electric machine and of electrical energy between the electric machine and the storage battery.

14 Claims, 3 Drawing Figures

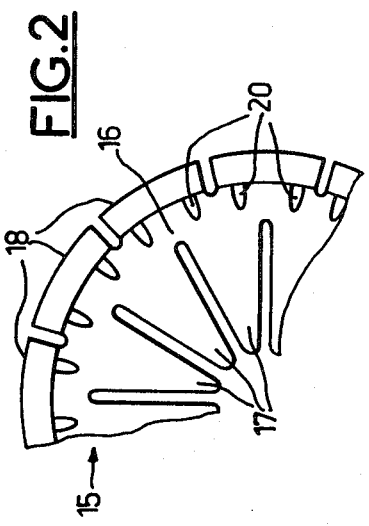
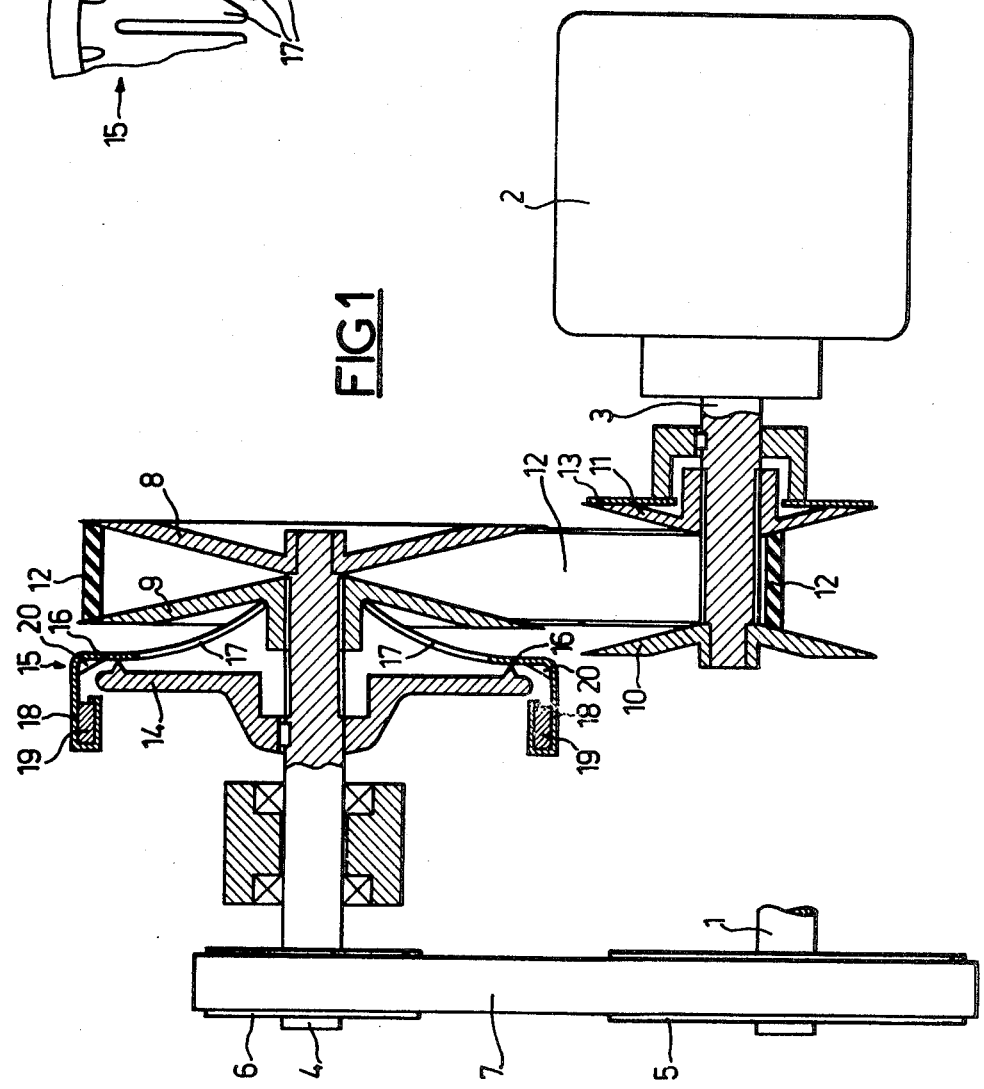

POWER UNIT FOR MOTOR VEHICLE UTILIZING A THERMAL ENGINE DOWN TO THE LOWEST RUNNING SPEEDS

This invention relates to the propulsion of automobile vehicles or the like.

It is known that in automobile town traffic conditions the average energetic efficiency of the engines and more particularly of internal combustion engines is very poor, and this is due mainly to three reasons, the first one being linked to the frequent stops during which the engine is idling for a zero useful work, the second one being linked to the many decelerations during which the engine fuel consumption is increased for a negative work, and the third one is linked to the many accelerations and level running stretches on intermediate gear ratios while the engine operates at a relatively high speed with low or very low torques, therefore at speeds involving a high specific fuel consumption for a moderate useful work.

Regarding the first reason, it is noted that when idling the fuel consumption is roughly proportional to the engine cubic capacity and to the richness of the air-fuel mixture. Now, a very slow idling speed would require, due to the irregularity of the engine torque, a flywheel having a very high moment of inertia which would be detrimental to the efficiency at medium and high speeds. On the other hand, lean mixtures affording low consumption and pollution ensure a smooth operation only when the engine is warm. During the many cold starts the starter device must be kept in operation more or less and this in actual practice assists in contradicting the optimistic results obtained during an official approval and boasted by manufacturers.

In connection with the second reason, it is known that when decelerating the fuel consumption is proportional to the idling consumption and to the engine vacuum, the latter increasing with the engine speed. Therefore, we have the same inconveniences as those mentioned hereinabove, except that they are amplified.

In connection with the third reason, it is known that in town traffic conditions too low gear ratios (in relation to those normally required) are imposed by several factors: the necessity, in actual practice, of keeping a certain reserve of acceleration for safety reasons; the trend of the torque/engine speed characteristics showing at low engine speeds a slope promoting instability, due to an increment in the reaction torque, entails a reduction in the engine speed causing in turn a reduction in the engine torque; at very low engine speeds, the irregularity of the engine torque, thus increasing the preceding inconvenience; finally, the modern trend towards the use of low cylinder capacity and high maximum speed engines, in which the substantial lag in the inlet valve closing movement is attended by a reduction of the cylinder charge at low engine speeds and therefore by a lower engine torque.

In addition to these conventional engines, so-called "hybrid" mixed-power units are also known which comprise an internal combustion engine of relatively reduced power output coupled with a reversible electric machine cooperating with a storage battery, so that when there is an excess of engine power output the electric machine recovers the excess power and charges the battery, whereas during the periods in which the engine power output is not sufficient, the electric machine operates as an electric motor and assists the thermal engine by discharging the battery. Consequently, in such power units it is assumed that the electric machine has a power rating of same magnitude as the thermal engine and that the storage battery has a substantial capacity to deliver the same power during a period ranging from a few minutes to a few tens of minutes. Therefore, power units of this character are extremely heavy and expensive.

Finally, on motor vehicles propelled by internal combustion engines, it is also known to use a continuous speed variator coupling the engine output shaft to the shaft of an auxiliary electric machine, for example a dynamo or an alternator, this variator being responsive to means for maintaining the velocity of rotation of the auxiliary electric machine within a predetermined smaller range. In this case of regulation parameter is generally the velocity of rotation of the driven auxiliary electric machine, and this parameter controls the variation of the step-up ratio in the direction to counteract any variation in this parameter.

It is the object of the invention to provide a power unit for motor vehicle which lessens the above-mentioned inconveniences both of conventional internal combustion engines and of assisted power units, by permitting the operation of an internal combustion engine down to extremely low rotational speeds.

To this end the invention utilizes a conventional internal combustion engine having a power output consistent with the vehicle concerned, and provided with its usual and possibly reduced flywheel, a reversible electric machine having substantially the usual power output, i.e. the power rating necessary for charging the storage battery and starting the power unit, an electric storage battery having substantially the usual storage capacity, and a variable speed drive coupling the electric machine to the internal combustion engine and an electric control circuit; however, the present invention comprises three essential features:

The first feature is that the electric control circuit is arranged for operating the internal combustion engine at rotational speeds considerably lower than those it could normally afford with its inertia flywheel, while regulating its driving torque of and alternately positive and negative exchanges of mechanical energy between the internal combustion engine and the electric machine, and of electrical energy exchanged between the electric machine and the storage battery, mainly within a cycle of the internal combustion engine, however with zero or relatively very low average rms power values delivered or received by the electric machine in relation to the maximum power output of the internal combustion engine.

As shown in the present invention, where there is an excess of power output, the electric machine recovers the excess power and charges the battery (positive exchange of mechanical energy from the engine), whereas during the periods when the engine power output is insufficient, the electric machine operates as an electric motor and assists the engine by discharging the battery (negative exchange of mechanical energy to the engine).

The second feature is that, in contrast to conventional hybrid systems in which the exchanges of rms energy between the electric machine and the internal combustion engine take place permanently, the electric circuitry is furthermore so arranged that the time periods during which these exchanges, obviously limited in the power range to the peak power output of the electric machine and of the storage battery, occur only during speed change periods, and last no more than a few seconds.

The third essential characteristic feature is that the variable step-down ratio of the variator is controlled by a suitable device as a function of the rotational speed measured either on the output shaft of the internal combustion engine or on a shaft rotating at a speed proportional thereto, in lieu of the shaft of the electric machine, and that this variator is adapted to transmit a relatively high drive torque and a relatively high reaction torque at low engine speeds with its maximum reduction ratio, this torque decreasing rapidly with the reduction ratio as the rotational speeds increase so as to transmit a considerably lower torque with an improved efficiency at medium and high rotational speeds.

Other features of the invention will appear as the following description proceeds with reference to the accompanying drawing showing by way of example a typical form of embodiment. In the drawing:

FIG. 1 illustrates diagrammatically a sectional view of the variable speed drive;

FIG. 2 illustrates in fragmentary front elevational view the regulating diaphragm.

Figure 3:
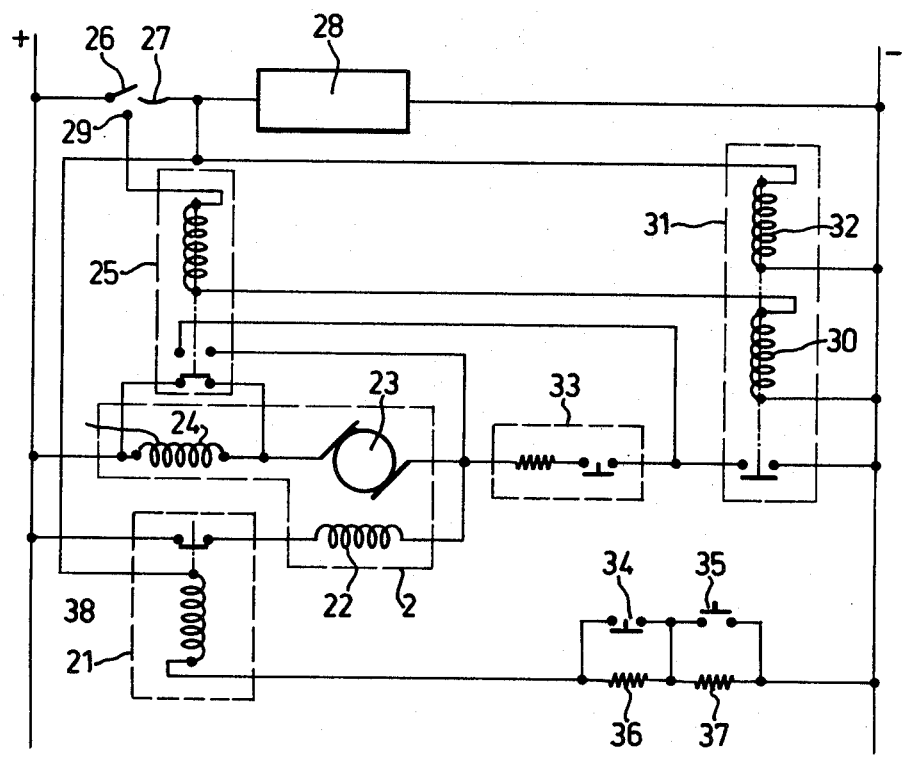
FIG. 3 is a wiring diagram of the device.

The power unit according to the invention comprises primarily an internal combustion engine of conventional design and power rating, with its inertia flywheel of conventional and possibly reduced size, and also its change-speed mechanism and its final drive for driving the wheels of the vehicle. These various elements are not shown in FIG. 1, except for the end 1 of the engine crankshaft. The power unit comprises on the other hand a storage battery of substantially conventional capacity, and a reversible electric machine 2 having a power rating either consistent with or slightly greater than the value necessary for charging the storage battery and starting the engine, but at any rate considerably lower than that of the internal combustion engine.

In fact, according to the invention, the essential purpose of transfering mechanical energy between the crankshaft 1 and the electric machine 2, and electrical energy between this machine and the storage battery, is not to palliate the deficiency in engine power output and therefore to be spread over considerable time periods, but only to palliate at very low engine speeds the inertia deficiency of its flywheel; consequently, at such very low engine speeds, and up to about one third of the usual idling speed, these exchanges of positive and negative energy take place alternately within a same cycle, i.e. between the various explosions of the engine cycle of operation.

For this purpose the electric machine 2 is driven by the engine crankshaft 1 through a variable-speed drive which, according to the invention, comprises three specific features. The first feature is that the parameter regulating the transmission ratio is the rotational velocity of crankshaft 1, or a velocity proportional thereto, in lieu of that of the shaft 3 of electric machine 2; the second feature is that the torque transmitted through this variator must be extremely high at low engine speeds when said regulating energy exchanges are particularly important, and decrease gradually to medium speeds when this function becomes secondary and then useless.

The third feature, already known in certain variable-speed drives but utilized in the reverse direction with respect to the conventional direction, and in combination with the first and second features disclosed hereinabove, is that when the power unit is stopped the variator is restored automatically to its position giving the maximum scaling-down ratio, which is a necessary requirement for subsequently re-starting the power unit.

For this purpose, any type of variable-speed drive, but preferably the simplest and most popular one, i.e. the V-belt and variable-diameter grooved pulley type as in the exemplary form of embodiment shown in FIG. 1, may be used.

The internal combustion engine is assumed for instance to have a maximum rotational speed of 6,000 r.p.m. and it is one purpose of this invention to reduce its idling speed to about 300 r.p.m. instead of the usual 900 r.p.m. Moreover, the purpose is not only to reduce the idling speed but also to take full advantage of the low engine speeds following this idling speed when actually running the vehicle.

The belt variator may be disposed directly between the engine crankshaft 1 and the shaft 3 of the electric machine 2, but preferably, in order to reduce the overall dimensions of the electric machine 2, a first scaling-down transmission should be interposed between the crankshaft 1 and a lay-shaft 4 to provide a step-up ratio of about 2 obtained for example by using two grooved pulleys 5, 6 and a cogged belt 7. Thus, the lay-shaft 4 will revolve at speeds within the range of 600 rpm to 12,000 rpm.

The variator proper comprises in a known fashion a first tapered-flange pulley having one of its flanges 8 rigidly secured to the end of lay-shaft 4, the other flange 9 being keyed on shaft 4 so as to be axially movable thereon and rotatably rigid therewith. The other pulley also comprises a fixed flange 10 rigid with the end of the shaft 3 of electric machine 2 and a movable flange keyed for axial sliding movement on said shaft 3. A conventional V-belt 12 engages these pulleys for transmitting the drive therebetween. The diameters of the variator pulleys are so selected that the scaling-down ratios, i.e. the speed ratios between shaft 3 and shaft 4, vary from a value of about 4 in the case illustrated in FIG. 1 to a value approaching 0,66, corresponding to a variation range of about 6. The regulation of this variation is spread over an engine speed range from 300 r.p.m. to about 1,800 r.p.m., corresponding to about 30 percent of the maximum engine speed.

When the engine is running at about 300 r.p.m., it is therefore necessary that the belt 12 and the two expansible pulleys transmit a relatively high torque on the one hand for transmitting an alternately positive and negative torque delivered electrically to the electric machine 2 and on the other hand for transmitting the inertia effects of the rotor of this electric machine which are somewhat multiplied by the transmission and add themselves to the inherent inertia of the engine flywheel. In contrast thereto, when the engine speed increases gradually from 300 to 1,800 r.p.m., the torque to be transmitted decreases very rapidly, since the engine does not require this assistance, and the electric machine requires only the mechanical power necessary for maintaining its continuous, and no more alternating, rotation, this mechanical power corresponding to its electric power rating.

To obtain this quick variation there is used according to the invention a spring 13, for example a diaphragm spring, exerting a return force against the movable flange 11 towards the fixed flange 10, this spring having on the one hand a substantial stiffness so that the effort transmitted in the position shown in FIG. 1 be relatively important, and on the other hand a relatively reduced flexibility so that this effort decreases very rapidly as the spring expands. This is rather uncommon in a variator of this type utilizing in general on the pulley of which the expansion is not controlled a spring as flexible as possible in order to produce an effort as constant as possible.

Moreover, according to another feature characterizing the invention, the regulation parameter is not the rotational velocity of the driven shaft 3 but that of the lay-shaft 4, and is proportional to the engine speed and controls the movement of the movable flange 9 of the first expansible pulley. This regulation control action may be obtained through any suitable electrical, mechanical, hydraulic or vacuum means, but it can also be obtained directly by using the centrifugal force with the assistance of the device illustrated in FIG. 1.

In this device, a fixed contra-flange 14 keyed to shaft 4 and facing the movable flange 9 may be used, in conjunction with a diaphragm spring 15 reacting against the contra-flange 14, for example by engaging the outer periphery thereof for urging the hub of flange 9 towards the other flange 8. This diaphragm spring, of which one portion is shown in FIG. 2, comprises a continuous annular portion 16 and tongues 17 extending radially inwards, the stiffness of the assembly being determined in such a way that the effort exerted on flange 9, and through the latter against the belt 12 and consequently against the flange 11 and diaphragm 15, be preponderant, i.e. capable of setting when inoperative the assembly in the condition shown in FIG. 1. In addition, this diaphragm 15 comprises integral outer peripheral segment portions 18 disposed at spaced intervals along a cylindrical surface and each weighed with an inertia weight 19; each segment portion 18 being rigidly connected by pressed gussets 20 to the continuous annular portion 16. Thus, as the speed of shaft 4 increases, the centrifugal force exerted on the weighed segments 18 causes a torsional movement to be imparted to the continuous annular portion 16, thus decreasing the thrust exerted by the resilient tongues 17.

In fact, an extreme degree of precision is not required in the manufacture of this assembly, and it is only necessary that the springs 13 and 15 be so adjusted that the reduction ratio 4 be preserved during the starting period until the crankshaft 1 rotates at 300 r.p.m., corresponding to a rotational velocity of 2,400 r.p.m., of shaft 3, and that on the other hand, when the engine speed increases gradually up to about 1,800 r.p.m. (i.e. 3,600 r.p.m. of shaft 4), the variator transmission ratio changes gradually to 0.66, which still provides a 2,400 r.p.m. speed of shaft 3.

At this time, the variator provides its maximum ratio and a subsequent increment in the engine rotational speed from 1,800 to 6,000 r.p.m. will thus produce a proportional increment in the rotational speed of the electric machine which changes from 2,400 to 8,000 r.p.m.

For this reason, it will be seen in FIG. 3 that in the wiring diagram the conventional voltage regulator 21 controlling the shunt coil 22 of the electric rotary machine 2 comprising a conventional armature 23 is maintained.

This electric machine 2 comprises preferably a second series excitation winding 24 normally shorted by the back contact of a relay 25. Thus, the electric machine can be used as a starter motor according to a known technique. For this purpose, the key ignition switch 26 comprises a first contact 27 adapted to be closed permanently by supplying electric current to the engine ignition system 28, and a second contact 29 adapted to be closed only temporarily and normally urged to the preceding position by a return spring (not shown), to permit the starting of the engine by using the ignition key in the known fashion. This contact 29, instead of supplying energizing current to the conventional starter motor or solenoid, controls the relay 25 and, in series or in parallel therewith, the main winding 30 of second relay 31 the front contact of which closes the energizing circuit of the electric machine 2. This second relay 31 comprises on the other hand a holding winding 32 energized through the ignition circuit 27.

Therefore, actuating the ignition key to the starting position 29 will thus eliminate the shunting of the series winding 24 and on the other hand energize the armature 23 together with its series and shunt field coils 24 and 22, respectively, so that the machine can start with a compound characteristic for starting and driving the engine. When the engine is running and the ignition key is returned to position 27, the holding coil 32 keeps the armature 23 and shunt winding 22 in their energized condition in order to exert a regulating function within the cycle, while the series induction coil 24 is shunted again. A safety temperature-responsive or thermal relay 33 is provided for protecting the machine 2 and the storage battery in case of accidental overload due either to a faulty control movement, for example when the ignition key is released too early, or to troubles such as faulty ignition or carburation. This relay 33 is also adapted to be shunted by a front contact of relay 25 to permit the operation of the electric machine as a starter motor without actuating the circuit-breaker.

The characteristics of the engine and of the variator of FIG. 1 as well as the electrical characteristics of the electric machine 2 are so selected and set when the engine is warm, its idling speed is about 300 r.p.m. and that at this speed the electric machine 2 rotates at a speed of 2,400 r.p.m. as mentioned in the foregoing and charges slightly the storage battery. In contrast thereto, when the engine is cold, a battery discharge may result which is utilized by the electric machine for momentarily assisting the internal combustion engine.

Finally, the reference numerals 36, 37 designate diagrammatically a device for assisting instantaneously the thermal engine both in acceleration and in deceleration. The control means (not shown) is for instance of the known "oil slide valve" type actuated by the accelerator pedal. A slow movement of this pedal will not move this device. A quick movement of the accelerator pedal will move this control device away from its inoperative position in one or the other direction during a time of the order of a few seconds which is proportional to the amplitude and rapidity of the pedal movement. This conrol device, when actuated in the deceleration direction, closes a first front contact 34 or, when actuated in the acceleration direction opens a second back contact 35. These contacts are adapted to shunt two resistors 36 and 37, respectively, inserted in series of the circuit of the voltage coil 38 of the field regulator 21 of electric machine 2. When inoperative, only resistor 37 is energized. When the accelerator pedal is moved rapidly the total resistance either decreases or increases, and consequently the voltage is regulated in a direction such that during an acceleration the electric machine can operate as an engine-assisting means, and during a deceleration it is caused to operate as an energy regenerating means. Since the power rating of the electric machine is considerably lower than that of the internal combustion engine, this assistance plays but a negligible role at normal engine speeds, and becomes extremely useful at low engine speeds of the order of 300 to 1,800 r.p.m. where it acts in the direction to correct the slope of the characteristic curve, which is a source of instability as explained in the foregoing. In fact, a very useful effect can be obtained in this field, even with a power rating of the order of 1 to 2 kW for the electric machine 2, the power rating of the internal combustion engine being in the range of from 30 to 50 kW.

Finally, it is clear that the power unit according to this invention, which comprises only one thermal or internalcombustion engine, an electric machine and a storage battery of normal power rating, and on the other hand a particularly simple automatic variator and furthermore a relatively small number of electrical component elements, is capable of reducing considerably the fuel consumption and also pollution, notably in town traffic conditions, and even of improving slightly the performances of the vehicle equipped with this power unit.

What is claimed as new is:

1. A power unit for automobile comprising an internal combustion engine operating according to the reciprocating cycle driving the wheels with its conventional inertia flywheel, a reversible electric machine, a storage battery, a speed variator coupling the electric machine to the internal combustion engine for producing a resultant torque, and an electric control circuit, characterized by the fact that:

said electric circuit is arranged for enabling the internal combustion engine to operate at rotational speeds considerably lower than those afforded by its flywheel, by regularizing its torque by means of instantaneous and alternately positive and negative exchanges of mechanical energy between the internal combustion engine and the electric machine, and of electrical energy between the electric machine and the storage battery, mainly within the same cycle of the internal combustion engine, however with average r.m.s. power values delivered or received by the electric machine and the storage battery which remain zero or relatively very low with respect to the maximum power output of the internal combustion engine, that said electric circuit comprises another arrangement permitting, between the internal combustion engine, on the one hand, the electric machine and the storage battery, on the other hand, considerable exchanges of efficient power but only during the acceleration or deceleration periods, and during time periods not in excess of a few seconds, and that the scaling-down ratio of said variator is controlled by means of a suitable device as a function of the measured velocity of rotation of the engine shaft or of a shaft rotating at a speed proportional thereto, and is so designed as to transmit a relatively high driving or reaction torque at low engine speeds when the variator is in its position providing the maximum scaling down, this torque decreasing rapidly with said scaling down when the engine speed increases, in order to transmit at medium and high engine speeds a considerably lower torque with a better efficiency.

2. Power unit according to claim 1, characterized by the fact that the speed variator is in its inoperative position when set to provide the maximum scaling-down ratio, and resumes this position automatically when the power unit is inoperative.

3. Power unit according to claim 2, wherein said variator is of the type comprising a V-belt coupling a pair of grooved pulleys of which the flanges are adapted to be moved away from each other, at least one of said pulleys being responsive to a return spring urging the flanges towards each other.

4. Power unit according to any of claim 3, characterized by the fact that the other pulley disposed on the side of the internal combustion engine comprises on the one hand a second spring stronger than the spring of the first pulley, and on the other hand a device incorporating centrifugal inertia weights acting in the direction to reduce the force of said second spring as the centrifugal force increases.

5. Power unit according to claim 4, wherein said electric machine is of the compound type with a series excitation and a regulated parallel excitation, and control means of the ignition switch key type comprising an ignition contact and a temporary starting contact, characterized by the fact that said electric circuit comprises a first relay having a back contact adapted to shunt said series excitation, the coil of said relay being adapted to be energized through said temporary starting contact, and a second relay having a front contact adapted to energize said electric machine, the coil of said second relay being connected to said starting contact in series or parallel relationship with the coil of said first relay, and a holding winding connected to said ignition contact.

6. Power unit according to claim 5, wherein said electric circuit further comprises a safety thermal relay inserted in the energizing circuit of said electric machine, characterized in that said first relay also comprises a front contact shunting said safety thermal relay.

7. Power unit according to claim 5, wherein said electric circuit further comprises in the circuit for regulating the parallel excitation a pair of additional resistors shunted by a pair of contacts actuated in turn by a device responsive to rapid movements of the accelerator pedal.

8. A power unit for a vehicle with wheels and a power transmission, said power unit comprising:

an internal combustion engine including an inertia flywheel and an engine shaft, said engine driving the vehicle wheels through said power transmission coupled to said engine shaft;

a storage battery;

a self reversible electric machine;

a speed variator drivingly coupling said electric machine to said engine shaft for producing a resultant torque, said speed variator including a means for controlling a variable scaling down ratio of said variator as a function of the rotation speed of said engine shaft, and said speed variator transmits a relatively high driving and reaction torque at low engine speeds when the variator is in a position providing a maximum scaling down, said reaction torque decreasing rapidly with said scaling down when the engine speed increases;

an electric control circuit electrically connecting said electric machine to said battery, said electric control circuit including:

a means for permitting instantaneous and alternately positive and negative exchanges of mechanical energy between the internal combustion engine and the electric machine, and of electrical energy between the electric machine and the storage battery, within a cycle of said internal combustion engine; and a means for exchanging power between the internal combustion engine, the electric machine and the storage battery during an acceleration and a deceleration period, whereby said resultant torque is regularized as to enable said internal combustion engine to operate at rotational speeds considerably lower than said flywheel.

9. Power unit according to claim 8, wherein said speed variator is in a rest position at a lower rotation speed range of said engine shaft which provides the maximum scaling-down ratio, and said speed variator resumes said rest position automatically when the power unit is inoperative.

10. Power unit according to claim 9, wherein said variator comprises a V-belt, a first and a second grooved pulleys with a plurality of flanges adapted to be moved away from each other, and at least said first pulley responsive to a first biasing spring urging the flanges towards each other, said first pulley being coupled to said electric machine, and said second pulley being coupled to said engine shaft.

11. Power unit according to claim 10, wherein said second pulley comprises a second biasing spring stronger than said first biasing spring of said first pulley, and a device incorporating centrifugal inertia weights acting in a direction to reduce the force of said second spring as the centrifugal force increases.

12. Power unit according to claim 11, wherein said electric machine includes a series excitation and a regulated parallel excitation, and said electric control circuit includes an ignition switch comprising an ignition contact and a temporary starting contact, and said electric control circuit further comprises a first relay with a coil having a rest contact adapted to shunt said series excitation, the coil of said first relay connected for energization through said temporary starting contact, and a second relay having a work contact adapted to energize said electric machine, said second relay including a main coil connected for energization through said temporary starting contact, and a holding coil connected to said ignition contact.

13. Power unit according to claim 12, wherein said electric control circuit further comprises a safety thermal relay inserted in said electric machine, and said first relay comprises a work contact shunting said safety thermal relay.

14. Power unit according to claim 12, wherein said electric control circuit further comprises in a circuit for regulating said parallel excitation, a pair of additional resistors shunted by a pair of contacts actuated in turn by a device responsive to rapid movements of an accelerator means.

* * * * *